(12) United States Patent
Manuel

(10) Patent No.: US 11,383,174 B2
(45) Date of Patent: Jul. 12, 2022

(54) MULTIFUNCTIONAL LEISURE, VOCATIONAL, AND ENTERTAINMENT DEVICE

(71) Applicant: Adrian Manuel, Fairhope, AL (US)

(72) Inventor: Adrian Manuel, Fairhope, AL (US)

(*) Notice: Subject to any disclaimer, the term of this patent is extended or adjusted under 35 U.S.C. 154(b) by 164 days.

(21) Appl. No.: 16/885,114

(22) Filed: May 27, 2020

(65) Prior Publication Data

US 2021/0370189 A1 Dec. 2, 2021

(51) Int. Cl.
*A47B 85/00* (2006.01)
*A47C 15/00* (2006.01)
*A63F 13/245* (2014.01)
*A63F 13/90* (2014.01)
*A47C 1/00* (2006.01)
(Continued)

(52) U.S. Cl.
CPC ............... *A63F 13/90* (2014.09); *A47C 1/00* (2013.01); *A47C 13/00* (2013.01); *A63F 13/245* (2014.09); *A63F 13/803* (2014.09); *A63F 2300/1062* (2013.01); *A63F 2300/8017* (2013.01)

(58) Field of Classification Search
CPC ........ A63F 13/24; A63F 13/245; A63F 13/90; A63F 13/98; A63F 13/803; A63F 2300/8017; A47B 2200/035; A47B 2200/0072–0077; A47B 85/00; A47B 85/06; A47B 2200/07; A47B 2200/0073; A47C 13/00; A47C 15/004
See application file for complete search history.

(56) References Cited

U.S. PATENT DOCUMENTS 1,485,549 A * 3/1924 Bieneman ............ A47B 17/036
  312/194
2,466,350 A * 4/1949 Anderson ............. A47D 3/005
  297/440.13
(Continued)

FOREIGN PATENT DOCUMENTS

AT       505969 A2 *  5/2009  ........... A47C 15/004
WO  WO-2009062221 A1 *  5/2009  ............. A63F 13/08

OTHER PUBLICATIONS

"Awesome DIY VR Cockpit Hides a Flight Simulator in Plain Sight," by Dominic Brennan, published Jul. 21, 2017. Source: https://www.roadtovr.com/diy-vr-cockpit-hidden-flight-simulator/ (Year: 2017).*

(Continued)

*Primary Examiner* — Steven J Hylinski
(74) *Attorney, Agent, or Firm* — AdamsIP, LLC; Edward B Garner, III; James H Adams

(57) ABSTRACT

A multifunctional furniture device that may simultaneously serve gaming, vocational, and lounging purposes is provided. The system generally comprises a framework, opening mechanism, platform, and seat. A user may alter the position of the various piece of the framework to create different furniture types. An opening mechanism of the device allows the pieces of the frame to move about one another and into different positions. A computing device, input device, and display may be incorporated into the device to allow the user to perform vocational and entertainment activities when the device is placed in one position and may then be completely hidden within an internal cavity of the device when placed in a different position.

20 Claims, 6 Drawing Sheets

(51) Int. Cl.
*A47C 13/00* (2006.01)
*A63F 13/803* (2014.01)

(56) References Cited

U.S. PATENT DOCUMENTS

| | | | | |
|---|---|---|---|---|
| 2,582,703 | A * | 1/1952 | Kirshbaum | A47C 13/00 |
| | | | | 312/266 |
| 4,669,789 | A * | 6/1987 | Pemberton | A47B 21/00 |
| | | | | 312/194 |
| 5,409,307 | A * | 4/1995 | Forsythe | A47B 85/06 |
| | | | | 312/194 |
| 5,466,041 | A * | 11/1995 | Hoffman | A47C 13/00 |
| | | | | 297/188.1 |
| 5,743,603 | A * | 4/1998 | Kelley | A47B 21/00 |
| | | | | 312/249.7 |
| 5,993,216 | A * | 11/1999 | Stogner | G09B 19/00 |
| | | | | 52/36.2 |
| 7,207,624 | B2 * | 4/2007 | Hoffman | A47C 3/16 |
| | | | | 297/118 |
| 10,606,308 | B2 * | 3/2020 | Jamele | A63F 13/27 |
| 2006/0046230 | A1 * | 3/2006 | MacDonald | G09B 9/08 |
| | | | | 434/55 |
| 2006/0163980 | A1 * | 7/2006 | Heathcote | A63F 13/08 |
| | | | | 312/241 |
| 2008/0236452 | A1 * | 10/2008 | Pratt | A47C 20/027 |
| | | | | 297/118 |
| 2014/0272809 | A1 * | 9/2014 | Martel | G09B 9/30 |
| | | | | 434/38 |

OTHER PUBLICATIONS

"ConverTTable," accessed Mar. 15, 2022. Source: www.converttable.com/en/index-2/ (Year: 2022).*

"Race-Star ConverTTable Arcade Racing Cabinet Folds Up Into a Stylish Table," published Dec. 6, 2010. Source: https://www.coolthings.com/race-star-converttable/ (Year: 2010).*

"Race-Star ConverTTable may be the coolest coffee table we've ever seen," by Jeff Glucker, published Dec. 3, 2010. Source: https://www.autoblog.com/2010/12/03/video-race-star-converttable-may-be-the-coolest-coffee-table-we/ (Year: 2010).*

"SimRig/Coffee Table," by PaniqPete, published Jan. 26, 2020. Source: https://www.reddit.com/r/simracing/comments/eu4izg/simrigcoffee_table/ (Year: 2020).*

"The Coffee Table Racing Seat Build," by Wintermute, published Jan. 19, 2012. Source: https://www.garagejournal.com/forum/threads/the-coffee-table-racing-seat-build.134644/ (Year: 2012).*

"UnEvn's ONE Portable Gaming Desk Lets Fold up Your Rig, Lug It With You," by Joe Shields, published Mar. 12, 2019. Source: https://www.tomshardware.com/news/unevn_one-portable-pc-desk-kickstarter,38791.html (Year: 2019).*

* cited by examiner

MULTIFUNCTIONAL LEISURE, VOCATIONAL, AND ENTERTAINMENT DEVICE

FIELD OF THE DISCLOSURE

The subject matter of the present disclosure refers generally to multifunctional furniture that may simultaneously serve gaming, vocational, and lounging purposes.

BACKGROUND

When designing the interior of a home, the look and design of a piece of furniture is important. This is because furniture allows one to define a space. The look and design of a room is often one of the first things someone will notice about a home, and since furniture helps form the look and design of a home, selecting the right types of furniture for the desired look and design is imperative. Further, people often designate certain rooms for certain purposes since much of the furniture available today has a design suited for one specific purpose. This can be a problem when one engages in hobbies or a vocation inside the home but doesn't have the space that would allow the luxury of an entire separate room dedicated to those activities. Currently, the use of vocational furniture and gaming furniture in areas of the home designated for lounging is largely considered taboo. As a result, vocational furniture and gaming furniture are often ignored in favor of other furniture types.

Gaming furniture and vocational furniture can also take up a lot of room, meaning unless one has a space dedicated entirely to gaming or their vocation, that gaming furniture or vocational furniture could be both an eye sore as well as an inconvenience if used in a traditional interior design setup. Though there are some who may be willing to sacrifice the look and design of a room for the convenience of having a large piece of vocational furniture or gaming furniture at their dispose, there are many others who are not willing to do so. This is especially true for more modern gaming methods, such as virtual reality (VR), since these more modern gaming methods often require a lot of space for a user to play effectively. Some racing/flying VR based games need specific gaming setups, which can take up considerable space and intensely clash with current interior design styles.

Therefore, there is a need in the art for furniture that may serve vocational and gaming purposes while also having the ability to hide any gaming/vocational components and design features when not in use.

SUMMARY

A system for a multifunctional leisure, vocational, and entertainment device is provided. In one aspect, the system of the present disclosure is designed to provide a piece of furniture that may take on multiple configurations that may be used for various purposes. In another aspect, the system of the present disclosure is designed to provide a piece of furniture that may store components of a second configuration within an inner cavity so that said components are not visible when in a first configuration. Generally, the system of the present disclosure allows a user to create a working space from a piece of furniture that may be completely hidden when not in use. The system generally comprises a framework, opening mechanism, platform, and seat.

The various pieces of the framework are designed to fit together in a way such that they may be arranged into at least two configurations, depending on a position of the framework pieces. In a preferred embodiment, the framework pieces may be placed into an open position or closed position, wherein an opening mechanism controls the orientation of the pieces relative to one another. The configurations are preferably of different furniture types, which may allow a user to use the device for multiple activities. In a preferred embodiment, the opening mechanism is attached to a bracket of the first end piece and/or second end piece of the framework. The opening mechanism controls how much the first end piece is allowed to rotate about the hinge. The top piece is configured to sit on top of the first side piece, second side piece, first end piece, and second end piece of the framework. the top piece may be operably connected to the first end piece or second end piece in a way such that rotating the first end piece or second end piece about the hinge may cause the top piece to also rotate about the hinge, thus exposing the internal cavity created by the frame.

At least one platform may be operably connected to the opening mechanisms in a way such that the surfaces of the platform generally perpendicular with the interior surfaces of the first side wall and second side wall. When the multifunctional leisure, vocational, and entertainment device is placed in an open position, the at least one platform is positioned within the working space in a way that allows a user to place a computing device, input device, notebook, tablet, etc. for working/entertainment purposes. The preferred embodiment of the device may further comprise a seat having a bottom panel and back panel operably connected to the interior surface of said bottom panel. In some preferred embodiments, a seat adjustment mechanism positioned between the first side piece and bottom panel, allowing a user to adjust the orientation of the seat. When the device is placed in an open position, the seat allows a user to sit within the resulting working space for work/entertainment purposes. The device may also comprise a computing device, display, and input device, which may allow a user to perform work/entertainment activities while sitting within the working space. The at least one platform, seat, computing device, display, and input device are configured to be contained within the cavity of the multifunctional leisure, vocational, and entertainment device when in a closed position.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For instance, a multifunctional leisure, vocational, and entertainment device "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 5:
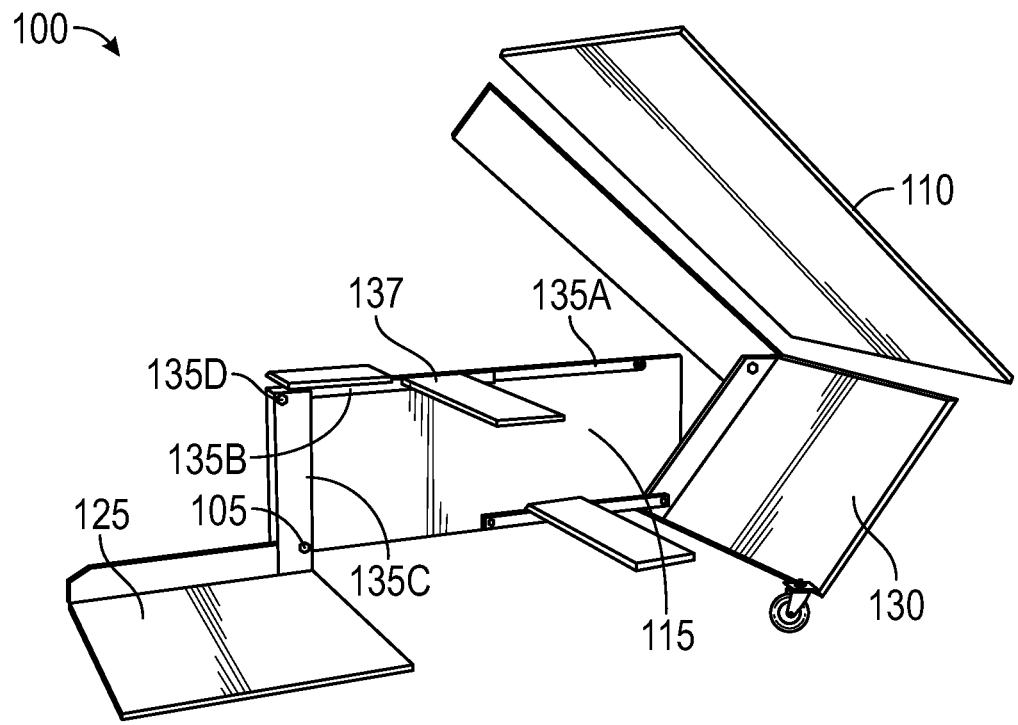
FIG. 5 illustrates a device embodying features consistent with the principles of the present disclosure.
Figure 6:
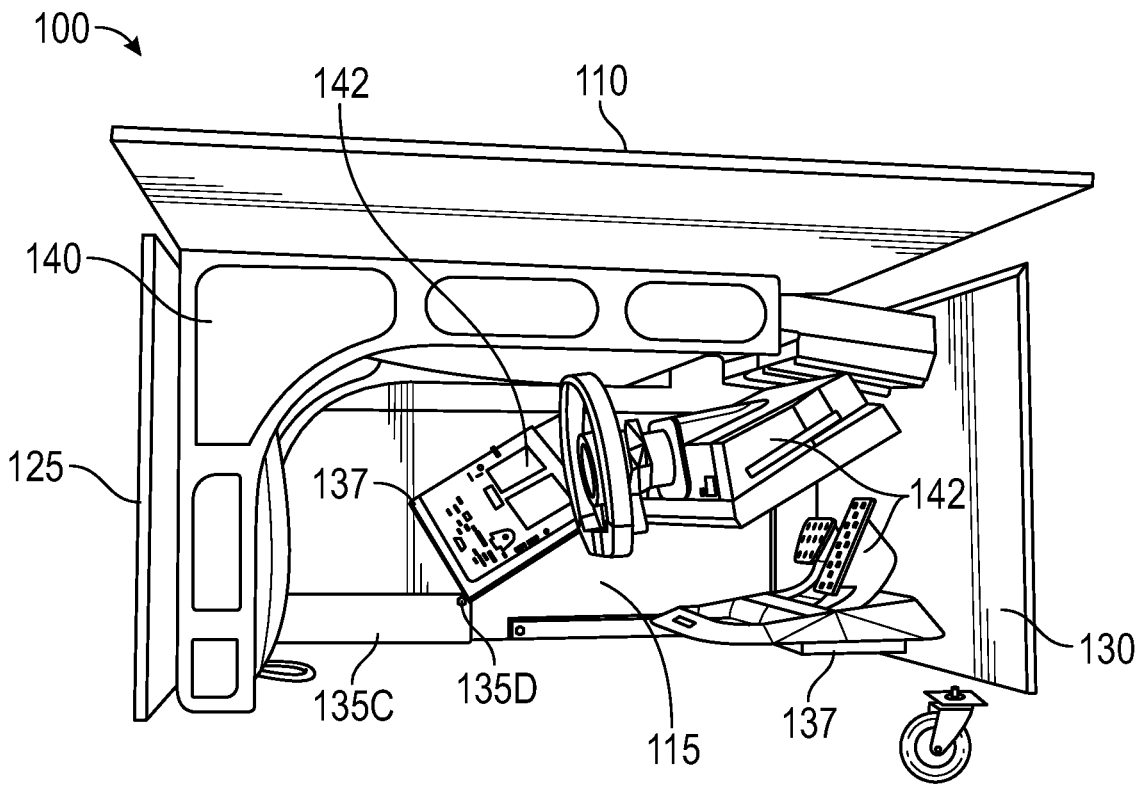
FIG. 6 illustrates a device embodying features consistent with the principles of the present disclosure.
Figure 7:
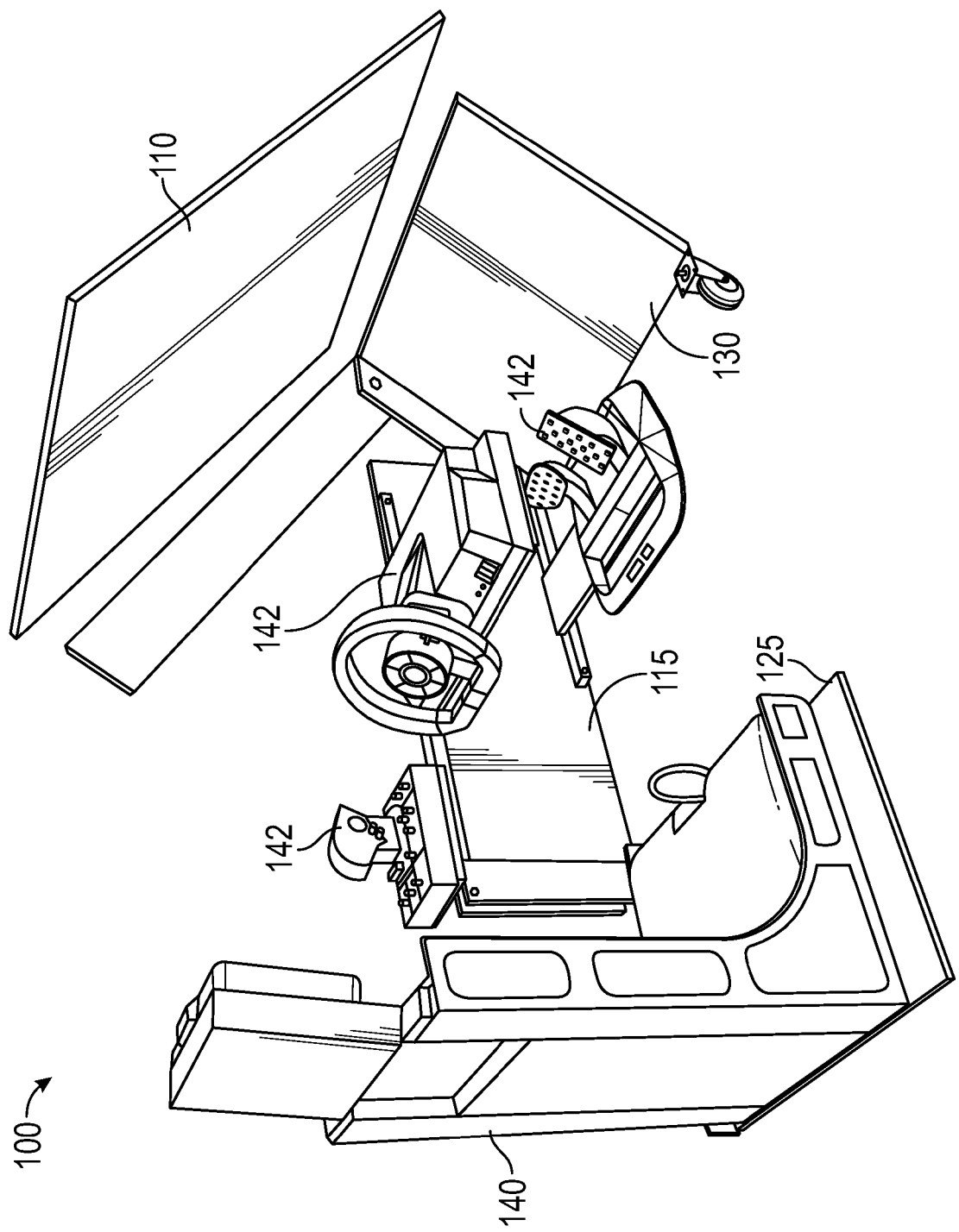
FIG. 7 illustrates a device embodying features consistent with the principles of the present disclosure.
Figure 8:
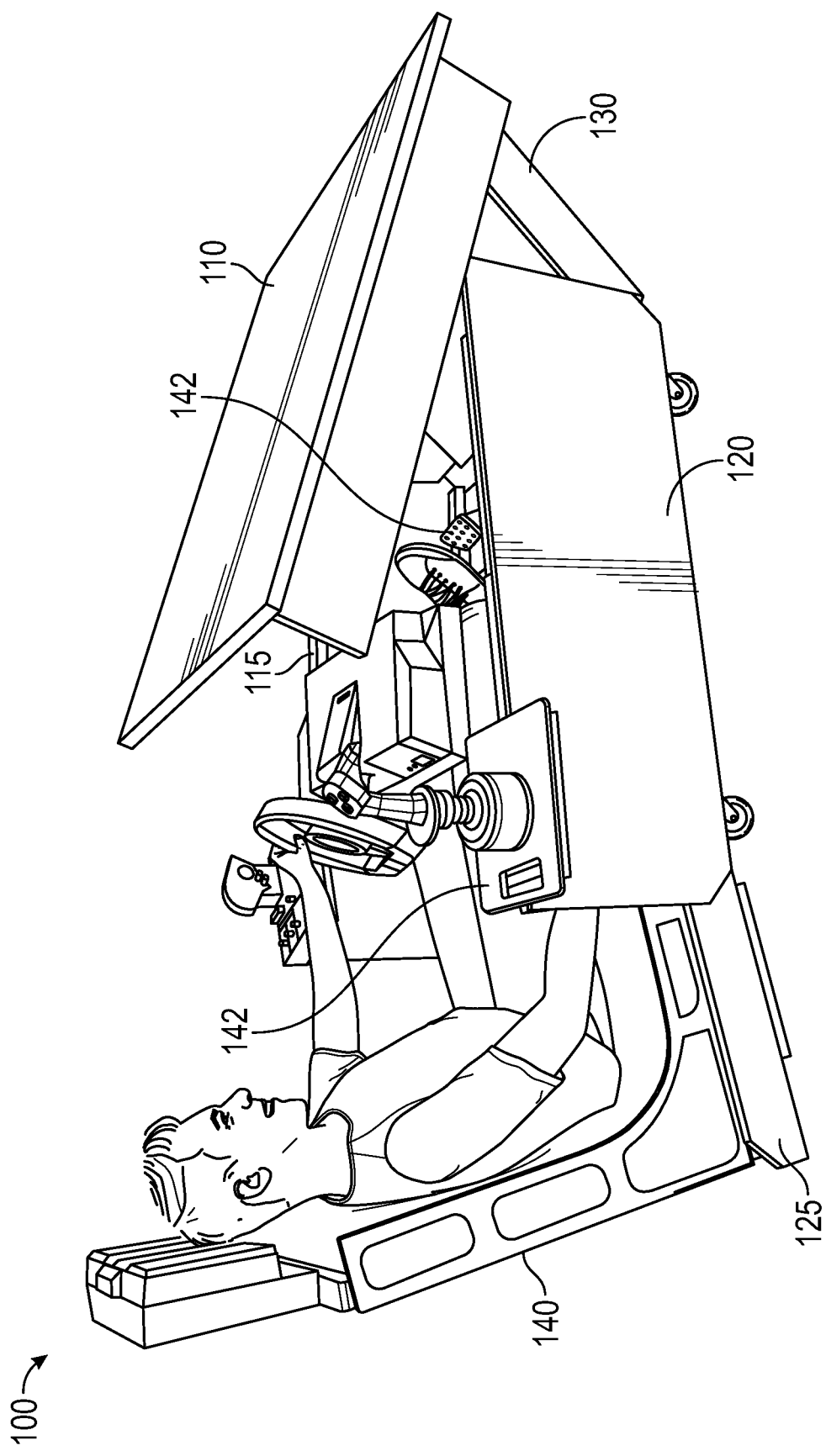
FIG. 8 illustrates a device embodying features consistent with the principles of the present disclosure.

As will be evident from the disclosure provided, the present invention satisfies the need for a multifunctional leisure, vocational, and entertainment device 100 that can accommodate work/entertainment needs while appearing as anything but a piece of furniture used for work/entertainment purposes. FIGS. 1-8 illustrate embodiments of the device 100. The multifunctional leisure, vocational, and entertainment device 100 generally comprises a framework, opening mechanism 135, platform 137, and seat 140. In one preferred embodiment, the device 100 further comprises a seat adjustment mechanism that allows a user to adjust the position of the seat 140 about the first end piece 125. In yet another preferred embodiment, the device 100 may further comprise at least one input device 142 that may be used to enhance a gaming environment. Other embodiments of the device 100 may include speakers and haptic feedback devices that may be used to further immerse a user into a gaming experience or message devise that may increase the comfort level of the user when sitting within the working space created by the device 100 when in an open position, as illustrated in FIGS. 7 and 8.

Figure 1:
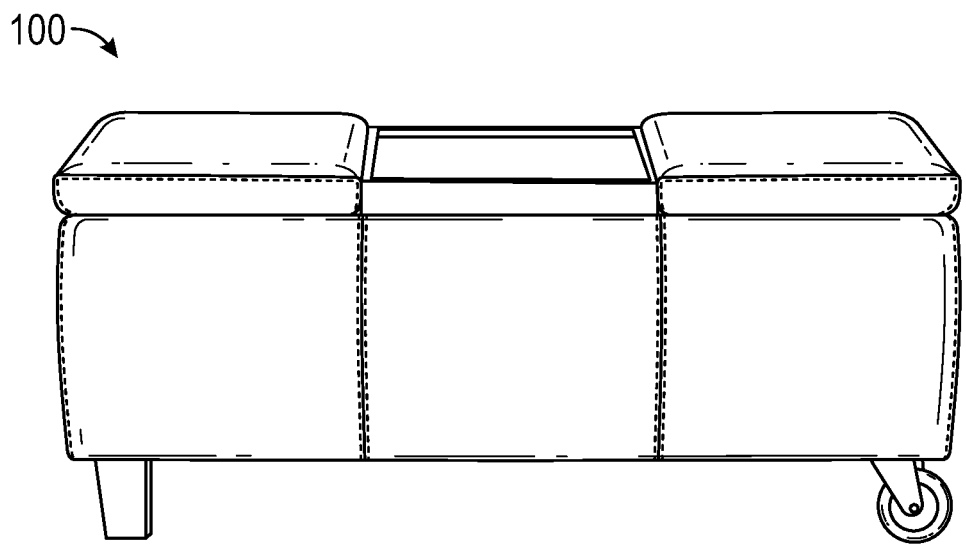
FIG. 1 illustrates a device embodying features consistent with the principles of the present disclosure.
Figure 2:
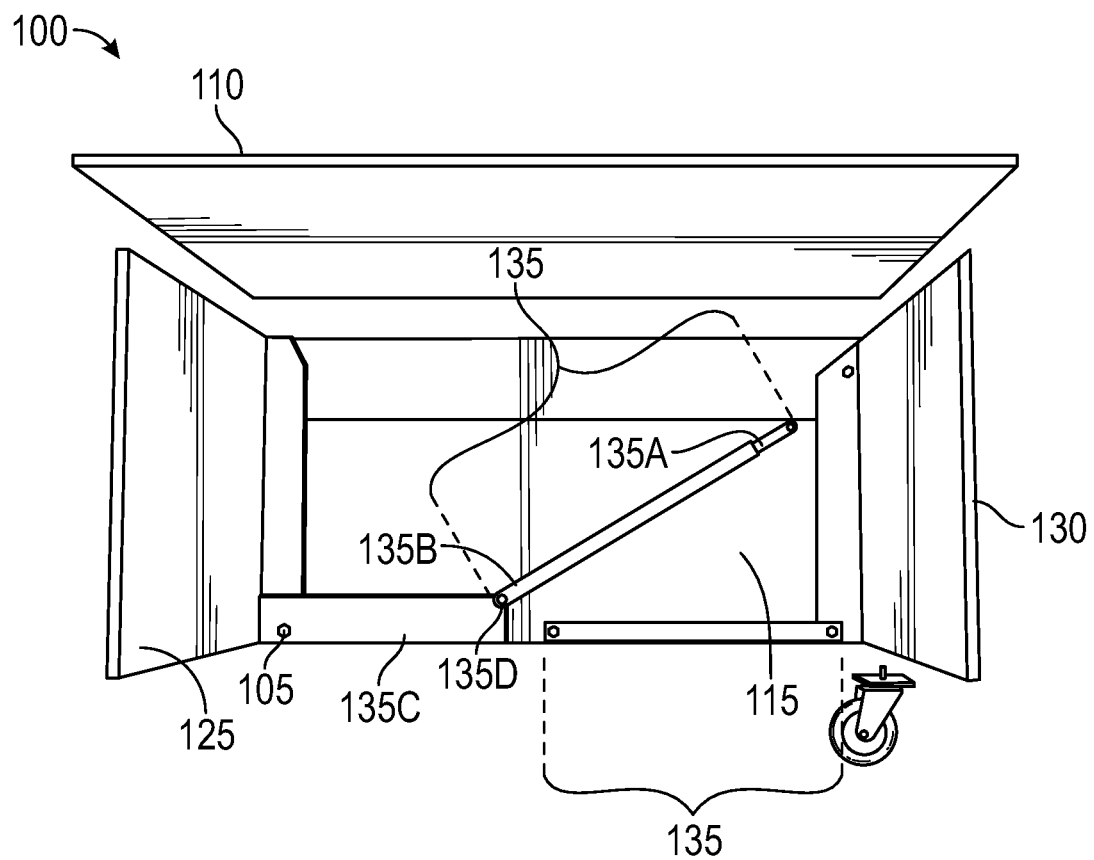
FIG. 2 illustrates a device embodying features consistent with the principles of the present disclosure.
Figure 3:
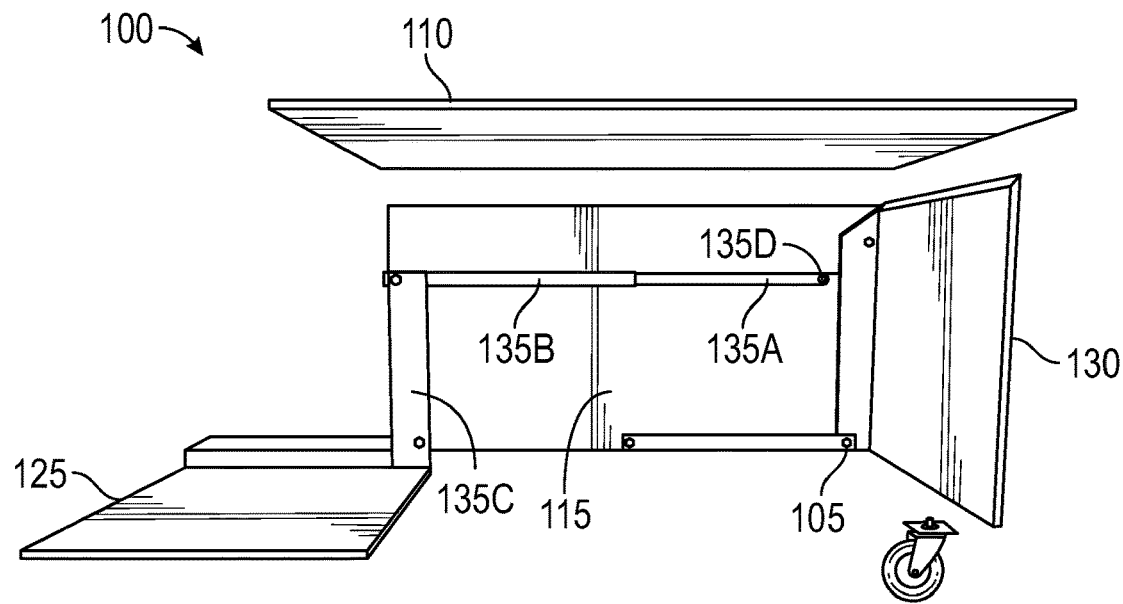
FIG. 3 illustrates a device embodying features consistent with the principles of the present disclosure.
Figure 4:
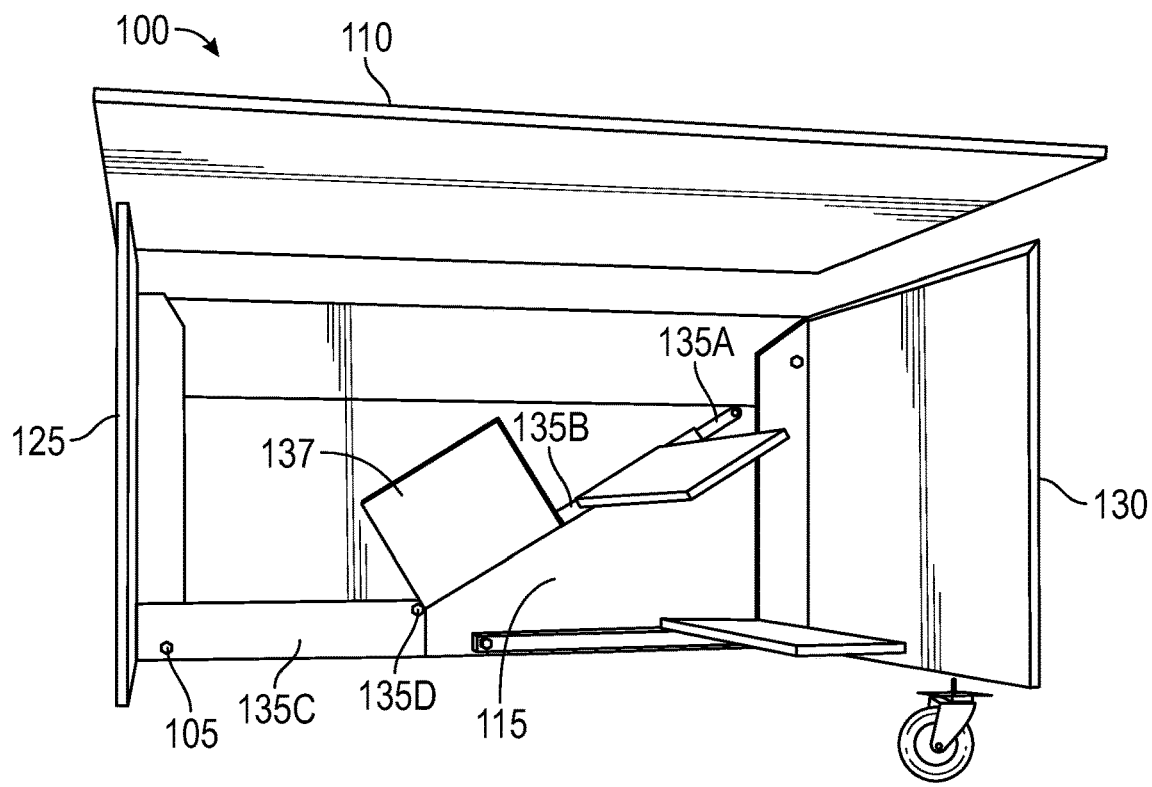
FIG. 4 illustrates a device embodying features consistent with the principles of the present disclosure.

FIG. 1 illustrates a perspective view of a multifunctional leisure, vocational, and entertainment device 100 in a closed position, thus forming a configuration that creates a furniture type that is different that the furniture type created by the device 100 in the open position. FIG. 2 illustrates a cross-sectional side view of a device 100 in a closed position. FIG. 3 illustrates a cross-sectional side view of a device 100 with a first end piece 125 in an open position and the top piece 110 in a closed position. FIG. 4 illustrates a cross-sectional side view of a device 100 in a closed position as well as the orientation of platforms 137 in the cavity created by the framework when in said closed position. FIG. 5 illustrates a cross-sectional side view of a device 100 in an open position as well as the orientation of platforms 137 when in said open position. FIG. 6 illustrates a cross-sectional side view of a device 100 in a closed position as well as the orientation of the seat 140 and input device 142 when in said closed position. FIG. 7 illustrates a cross-sectional side view of a device 100 in an open position as well as the orientation of the seat 140 and input device 142 when in said open position. FIG. 8 illustrates how a user might use the multifunctional leisure, vocational, and entertainment device 100 when in an open position.

In a preferred embodiment, the framework of the multifunctional leisure, vocational, and entertainment device 100 comprises a top piece 110, first side piece 115, second side piece 120, first end piece 125, and second end piece 130, wherein each piece of the frame has an interior surface and exterior surface. Materials that may be used to construct the framework include, but are not limited to, wood, aluminum, steel, plastic, or any combination thereof. In another preferred embodiment, the frame may further comprise a bottom piece, which may be connected to the first side piece 115 and second side piece 120 to hold them rigidly in place. The bottom piece may also eliminate the need for the hinges 105 to attach to the first side piece 115 and second side piece 120. In some preferred embodiments, the top piece 110 may also act as the first end piece 125 and/or second end piece 130. The various pieces of the framework are designed to fit together in a way such that they may be arranged into at least two configurations, depending on a position of the framework pieces. In a preferred embodiment, the framework pieces may be placed into an open position or closed position, wherein an opening mechanism 135 controls the orientation of the pieces relative to one another. The configurations are preferably of different furniture types, which may allow a user to use the multifunctional leisure, vocational, and entertainment device 100 for multiple activities. Furniture types that the device 100 may take on include, but are not limited to, tables, chairs, desks, ottomans, beds, or any combination thereof.

In a preferred embodiment, the first side piece 115 and second side piece 120 are rigidly attached to a hinge 105 on a left end and right side of said hinge 105. The first end is operably connected to the hinge 105 and is operably connected to the first side piece 115 and/or second side piece 120 via the opening mechanism 135. In a preferred embodiment, the opening mechanism 135 is attached to a bracket 135C of the first end piece 125 and/or second end piece 130. The opening mechanism 135 controls how much the first end piece 125 is allowed to rotate about the hinge 105. In a preferred embodiment, the opening mechanism 135 allows the first end piece 125 to rotate about the hinge 105 in a way such that the first end piece 125 is parallel with the floor in which the multifunctional leisure, vocational, and entertainment device 100 is sitting upon. In another preferred embodiment, the second end piece 130 is operably connected to the hinge 105 and the first side piece 115 and second side piece 120 via an opening mechanism 135. In one preferred embodiment, the opening mechanism 135 of the second end piece 130 is configured in a way such that the dihedral angle formed by the planes of the first end piece 125 and second end piece 130 when in an open position is less than 180-degrees. The top piece 110 is configured to sit on top of the first side piece 115, second side piece 120, first end piece 125, and second end piece 130. In one preferred embodiment, the top piece 110 may be operably connected to the first end piece 125 or second end piece 130 in a way such that rotating the first end piece 125 or second end piece 130 about the hinge 105 may cause the top piece 110 to also rotate about the hinge 105, thus exposing the internal cavity created by the frame, as illustrated in FIGS. 2, 4, and 6.

The opening mechanism 135 preferably comprises a rotating rod 135B having a first end and second end as well as a rotating bar 135A having a bar end and side piece end. The rotating rod 135B and rotating bar 135A are preferably telescopic, wherein one of the second end of the rotating rod 135B or bar end of the rotating bar 135A telescopes into and out of the other. The opening mechanism 135 is operably connected to the first end piece 125 and/or second end piece 130 in a way such that the first end piece 125 and/or second end piece 130 may rotate about the hinge 105. In one preferred embodiment, the opening mechanism 135 may further comprise a rotating joint 135D, which may allow the rotating rod 135B and rotating bar 135A to rotate about a central axis of the rotating joint 135D. In a preferred embodiment, the rotating joint 135D may be used to operably connect the first side piece 115 to the first end of the rotating bar 135A and the first side piece 115 and/or second side piece 120 to the side piece end of the rotating. When attached to a bracket 135C of the first end piece 125 and/or second end piece 130, the rotating joints 135D may allow the first end piece 125 and/or second end piece 130 to be placed into an open position. In the preferred embodiment, as illustrated in FIG. 3, the inner surface of the first end piece 125 and/or second end piece 130 make a 180-degree dihedral angle with a bottom plane created by the area between the hinges 105, first side piece 115, and second side piece 120.

The preferred embodiment of the multifunctional leisure, vocational, and entertainment device 100 may further comprise a seat 140 having a bottom panel and back panel operably connected to the interior surface of said bottom panel. In some preferred embodiments, a seat adjustment mechanism positioned between the first side piece 115 and bottom panel. The bottom panel is connected to the first end piece 125 in a way such that a user may sit on top of the bottom panel when the bottom panel is in an open position. The back panel is positioned in a way such that a user may sit within the working space with their back to said back panel and facing said second end piece 130. In a preferred embodiment, the back panel and front panel may be connected via a joint. The bottom panel and back panel may be adjusted about the joint in a way such that the dihedral angle created by the bottom panel and back panel may be altered. The seat 140 is configured to be contained within the cavity of the device 100 when in a closed position, as illustrated in FIG. 6. When the device 100 is placed in an open position, the seat 140 allows a user to sit within the resulting working space for work/entertainment purposes, as illustrated in FIGS. 7 and 8.

The multifunctional leisure, vocational, and entertainment device 100 may further comprise at least one platform 137 having a counter surface and an under surface. The at least one platform 137 is operably connected to the opening mechanism 135 in a way such that the counter surface and under surface are generally perpendicular with the interior surfaces of the first side piece 115 and second side piece 120. In one preferred embodiment, the at least one platform 137 is fixated to the opening mechanism 135 so its position within the working space may not be adjusted by a user once the opening mechanism 135 is in an open position or closed position. Alternatively, the at least one platform 137 may be operably connected to the opening mechanism 135 via a pivot, which may allow a user to rotate the platform 137 about a central axis. In other preferred embodiments, the pivot may allow a user to change the location of the at least one platform 137 within the working space created when the device 100 is in an open position. This allows a user to place a computing device, input device 142, notebook, tablet, etc. for work/entertainment purposes in a position most comfortable to the user, as illustrated in FIGS. 5, 7, and 8. Users may lock the at least one platform 137 into a preferred position using a locking element and, in some embodiments, an at least one aperture of the pivot. Apparatuses that may act as the locking element include, but are not limited to, push-pull pins, clamps, set knobs, snap locks, spring buttons, and clutch locks, or any combination thereof. The at least one platform 137 is configured to be contained within the cavity of the multifunctional leisure, vocational, and entertainment device 100 when in a closed position, as illustrated in FIGS. 4 and 6.

In some preferred embodiments, the multifunctional leisure, vocational, and entertainment device 100 may comprise a computing device. A computing device is intended to represent various forms of digital computers, such as laptops, desktops, workstations, servers, databases, mainframes, and other appropriate computers. The computing device may be implemented in a number of different forms. For instance, a computing device may be implemented as a server or in a group of servers. In addition, a computing device may be implemented as a personal computer, such as a desktop computer or laptop computer. A computing device may include a processor, memory, storage device, high-speed expansion ports, low-speed expansion ports, and bus operably connecting the processor. In one preferred embodiment, the bus may comprise a high-speed interface connecting the processor to the memory and high-speed expansion ports as well as a low-speed interface connecting to the low-speed expansion ports and the storage device. Because each of the components are interconnected using the bus, they may be mounted on a common motherboard or in other manners as appropriate. In a preferred embodiment, the computing device comprises at least one graphical processing unit (GPU), which may assist or fully replace the processor when generating two-dimensional and three-dimensional images from a model by means of computing instructions.

The processor may process instructions for execution within the computing device, including instructions stored in memory or on the storage device. Processing these instructions may cause the computing device to display graphical information for a GUI on an output device, such as a display coupled to the high-speed interface. In other implementations, multiple processors and/or multiple buses may be used, as appropriate, along with multiple memory units and/or multiple types of memory. Additionally, multiple computing devices may be connected, wherein each device provides portions of the necessary operations. In a preferred embodiment, the computing device of the present disclosure may be used by the user in a virtual reality context, but a user may use the computing device of the present disclosure in any manner of ways without departing from the inventive subject matter described herein.

The multifunctional leisure, vocational, and entertainment device 100 may present data of the computing device to the user via a display operably connected to the processor. A display may be defined as an output device that communicates data that may include, but is not limited to, visual, auditory, cutaneous, kinesthetic, olfactory, and gustatory, or any combination thereof. Information presented via a display may be referred to as a soft copy of the information because the information exists electronically and is presented for a temporary period of time. Information stored on the non-transitory computer-readable medium may be referred to as the hard copy of the information. For instance, a display may present a soft copy of visual information via a liquid crystal display (LCD) mounted to the interior surface of the top piece 110, wherein the hardcopy of the visual information is stored on a local hard drive. For instance, a display may present a soft copy of audio information via a speaker attached to the at least one platform 137, wherein the hard copy of the audio information is stored memory. For instance, a display may present a soft copy of tactile information via a haptic feedback device integrated into the seat 140, wherein the hard copy of the tactile information is stored within a database.

Displays may include, but are not limited to, cathode ray tube monitors, LCD monitors, light emitting diode (LED) monitors, gas plasma monitors, screen readers, speech synthesizers, haptic feedback devices, virtual reality headsets, speakers, and scent generating devices, or any combination thereof. Some preferred embodiments of the device 100 may comprise a display unit, which may be defined as a plurality of displays that work together to display information to a user. For instance, the device 100 of the present disclosure may comprise a computing device operably connected to a virtual reality headset, haptic feedback device, and speakers to create a display unit that may fully immerse a user into a virtual racing environment. For instance, the device 100 acting as a coffee table in a closed position and a gaming racing rig in an open position may comprise a first LCD screen that is incorporated into the exterior surface of the top piece 110 and a second LCD screen that is incorporated into the interior surface of the top piece 110. A user may use the device 100 to play traditional joystick-based arcade games when in a closed position using the first LCD screen and may use the multifunctional leisure, vocational, and entertainment device 100 to play racing arcade games when in an open position using the second LCD screen.

As used herein, an input device 142 may be defined as a device that allows a user to input data and instructions that is then converted into a pattern of electrical signals in binary code that are comprehensible to a computing device. An input device 142 may include one or more conventional devices that permit a user to input information into the computing device, such as a scanner, phone, camera, scanning device, keyboard, a mouse, a pen, voice recognition and/or biometric mechanisms, etc. In a preferred embodiment, the input device 142 is mounted to the counter side of the at least one platform 137. When the multifunctional leisure, vocational, and entertainment device 100 is placed in a closed position, the input device 142 is stored within the internal cavity, thus hiding it from view. Alternatively, other devices may be mounted to the at least one platform 137, including foot massaging devices, ellipticals, heat pads, cardio cycles, fans, or any combination thereof. For instance, a foot massaging device may be operably connected to the second end piece 130 in a way such that a user sitting in the seat 140 may have the foot massage device massage their feet.

Figure 9:
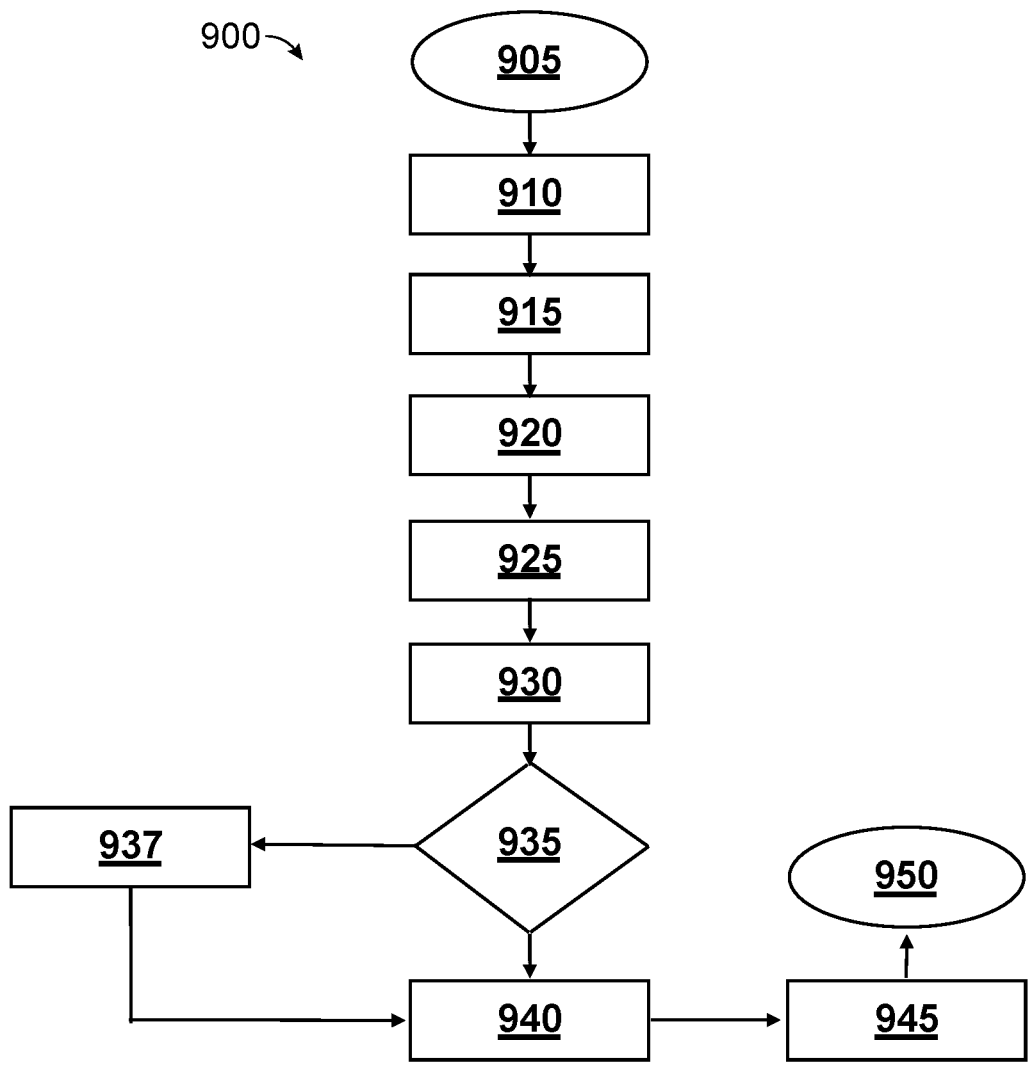
FIG. 9 is a flow chart illustrating certain method steps of a method embodying features consistent with the principles of the present disclosure.

FIG. 9 provides a flow chart 900 illustrating certain, preferred method steps that may be used to carry out the method of opening the multifunctional leisure, vocational, and entertainment device 100 illustrated in FIGS. 7 and 8. Step 905 indicates the beginning of the method. During step 910, a user may obtain the device 100. The user may then lift the top piece 110 in a way that causes the second end piece 130 to rotate about the hinge 105 during step 915, placing the second end piece 130 and top in an open position. Rotation of the second end piece 130 about the hinge 105 causes the opening mechanism 135 attached thereto to extend, which moves the rotating rod 135B and platform 137 in a direction towards the second end piece 130. Once the second end piece 130 and top are in an open position, the user may move the first end piece 125 in a way that causes the first end piece 125 to rotate about the hinge 105 during step 920, placing the first end piece 125 in an open position. Rotation of the first end piece 125 about the hinge 105 causes the opening mechanism 135 attached thereto to extend, which moves the rotating rod 135B and platform 137 attached to said rotating rod 135B about a joint operably connected to said rotating bar 135A and the first side piece 115 and/or second side piece 120. Rotation of the first end piece 125 about the hinge 105 also causes the seat 140 to be placed in an upright position, creating a working space for the user.

The user may then sit in the seat 140 during step 925 and perform a query on whether or not to adjust the seat 140 during step 930. In a preferred embodiment, a user will decide the position of the seat 140 based on the comfort in which the input device 142 of the multifunctional leisure, vocational, and entertainment device 100 are oriented within the working space. For instance, a user may choose to adjust the orientation of the seat 140 in a direction away from the second end piece 130 so that pedal controls attached to the platform 137 of the opening mechanism 135 of the second end piece 130 are more comfortable to reach with their feet. Based on the results of the query, the user may take an action during step 935. If the user decides not to adjust the orientation of the seat 140, the user may proceed to step 940. If the user decides to adjust the orientation of the seat 140, the user may adjust the seat 140 via the seat adjustment mechanism during step 937. Once a user is satisfied with the orientation of the seat 140 within the working space, the user may turn on the computing device during step 940. The user may then position the display of the computing device in a way that allows the user to see information presented by the computing device during step 945. In a preferred embodiment, the display is a VR headset. Once the user has positioned the display, they may proceed to terminate method step 950.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and process stages which have been described and illustrated in order to explain the nature of this inventive subject matter can be made without departing from the principles and scope of the inventive subject matter.

What is claimed is:

1. An opening mechanism for a reconfigurable furniture device comprising:
   a first rotating bar having a first end and a second end, wherein said first rotating bar is rotatably attached to a first side wall at said first end,
   a second rotating bar having a first end and a second end, wherein said second rotating bar is rotatably attached to a second sidewall at said first end,
   a first rotating rod having a bar end and an end piece end, wherein said first rotating rod is slideably attached to said first rotating bar,
   a second rotating rod having a bar end and an end piece end, wherein said second rotating rod is slideably attached to said second rotating bar,
   wherein said bar end of said first rotating rod is attached to said second end of said first rotating bar,
   wherein said bar end of said second rotating rod is attached to said second end of said second rotating bar,
   a first bracket rotatably attached to said first sidewall and second sidewall via a hinge, wherein said first rotating rod is rotatably attached to said first bracket at said end piece end,
   a second bracket rotatably attached to said second sidewall via a hinge, wherein said second rotating rod is rotatably attached to said second bracket at said end piece end, and
   a platform attached to at least one of said first rotating rod and said second rotating rod,
   wherein movement of said first bracket and second bracket about said hinge causes said first rotating rod to slideably move about said first rotating bar and said second rotating rod to slideably move about said second rotating bar,
   wherein movement of said first bracket and second bracket about said hinge causes said first rotating bar to rotatably move about said first sidewall, and wherein movement of said first bracket and second bracket about said hinge causes said second rotating bar to rotatably move about said second sidewall.

2. The opening mechanism of claim 1, wherein said platform is attached to said first rotating rod located at a bottom end of said first sidewall, wherein said platform is attached to said second rotating rod located at said bottom end of said second sidewall, wherein movement of said first bracket and said second bracket about said hinge causes said first rotating rod and said second rotating rod to move in a horizontal direction.

3. The opening mechanism of claim 1, wherein said platform is attached to one of said first rotating rod and said second rotating rod, wherein movement of said first bracket and said second bracket about said hinge causes said first rotating rod and said second rotating rod to move in a vertical direction.

4. The opening mechanism of claim 3, wherein movement of said first bracket and said second bracket about said hinge causes said platform to rotate about a central axis.

5. The opening mechanism of claim 1, further comprising an end piece connected to said first bracket and second bracket, wherein movement of said end piece causes said first bracket and said second bracket to rotate about said hinge.

6. The opening mechanism of claim 5, further comprising a top piece rigidly attached to said end piece,
   wherein said top piece rests at a top end of said first sidewall and said second sidewall when in a closed position,
   wherein movement of said end piece to an open position causes said top piece to move from said top end of said first sidewall and said second sidewall.

7. The opening mechanism of claim 1, wherein said bracket is generally L-shaped.

8. An opening mechanism for a reconfigurable furniture device comprising:
   a first rotating bar having a first end and a second end, wherein said first rotating bar is rotatably attached to a first side wall at said first end,
   a second rotating bar having said first end and said second end,
      wherein said second rotating bar is rotatably attached to a second sidewall at said first end,
   a first rotating rod having a bar end and a end piece end, wherein said first rotating rod is slideably attached to said first rotating bar,
      wherein said bar end of said first rotating rod is attached to said second end of said first rotating bar,
   a second rotating rod having said bar end and said end piece end,
      wherein a second rotating rod is slideably attached to said second rotating bar,
      wherein said bar end of said second rotating rod is attached to said second end of said second rotating bar, and
   a first bracket rotatably attached to said first sidewall via a hinge,
      wherein said first rotating rod is rotatably attached to said first bracket at said end piece end,
   a second bracket rotatably attached to said second sidewall via said hinge,
      wherein said second rotating rod is rotatably attached to said second bracket at said end piece end,
   an arm platform attached to one of said first rotating rod and said second rotating rod,
      wherein said arm platform is positioned between said first sidewall and said second sidewall when in a closed position,
      wherein said arm platform is positioned to one side of one of said first sidewall and said second sidewall when in an open position,
   wherein movement of said first bracket and second bracket about said hinge causes said first rotating rod to slideably move about said first rotating bar and said second rotating rod to slideably move about said second rotating bar,
   wherein movement of said first bracket and second bracket about said hinge causes said first rotating rod to rotatably move about said first rotating bar and said second rotating rod to rotatably move about said second rotating bar.

9. The opening mechanism of claim 8, wherein movement of said first bracket and said second bracket about said hinge causes said arm platform to move in a vertical direction when going from said open position to said closed position.

10. The opening mechanism of claim 9, wherein movement of said first bracket and said second bracket about said hinge causes said arm platform to rotate about one of said first rod and said second rod while moving in said vertical direction.

11. The opening mechanism of claim 8, further comprising an end piece connected to said first bracket and said second bracket, wherein movement of said end piece causes said first bracket and said second bracket to rotate about said hinge.

12. The opening mechanism of claim 11, further comprising a top piece rigidly attached to said end piece,
   wherein said top piece rests at a top end of side first sidewall and said second sidewall when in a closed position,
   wherein movement of said end piece to an open position causes said top piece to move from said top end of said first sidewall and said second sidewall.

13. The opening mechanism of claim 11, further comprising a seat attached to an inner surface of said end piece.

14. The opening mechanism of claim 8, wherein said first bracket and said second bracket are generally L-shaped.

15. An opening mechanism for a reconfigurable furniture device comprising:
   a first rotating bar having a first end and a second end,
      wherein said first rotating bar is rotatably attached to a first side wall at said first end,
   a second rotating bar having said first end and said second end,
      wherein said second rotating bar is rotatably attached to a second sidewall at said first end,
   a first rotating rod having a bar end and a end piece end,
      wherein said first rotating rod is slideably attached to said first rotating bar,
      wherein said bar end of said first rotating rod is attached to said second end of said first rotating bar,
   a second rotating rod having said bar end and said end piece end,
      wherein a second rotating rod is slideably attached to said second rotating bar,
      wherein said bar end of said second rotating rod is attached to said second end of said second rotating bar, and
   a first bracket rotatably attached to said first sidewall via a hinge,
      wherein said first rotating rod is rotatably attached to said first bracket at said end piece end,
   a second bracket rotatably attached to said second sidewall via said hinge,
      wherein said second rotating rod is rotatably attached to said second bracket at said end piece end,
   a foot platform attached to said first rotating rod and said second rotating rod,
      wherein said foot platform is in a first position between said first sidewall and said second sidewall when in an open position,
      wherein said foot platform is in a second position between said first sidewall and said second sidewall when in a closed position.

16. The opening mechanism of claim 15, wherein movement of said first bracket and second bracket about said hinge causes said first rotating rod to slideably move about said first rotating bar and said second rotating rod to slideably move about said second rotating bar.

17. The opening mechanism of claim 15, further comprising an end piece connected to said first bracket and said second bracket, wherein movement of said end piece causes said first bracket and said second bracket to rotate about said hinge.

18. The opening mechanism of claim 17, further comprising a top piece rigidly attached to said end piece,
   wherein said top piece rests at a top end of side first sidewall and said second sidewall when in a closed position,
   wherein movement of said end piece to an open position causes said top piece to move from said top end of said first sidewall and said second sidewall.

19. The opening mechanism of claim 17, further comprising a seat attached to an inner surface of said end piece.

20. The opening mechanism of claim 15, wherein said first bracket and said second bracket are generally L-shaped.

\* \* \* \* \*